May 23, 1967  R. A. BIRON  3,320,694

HERBICIDE DISPENSER

Filed Dec. 3, 1965

INVENTOR.
Raphael A. Biron
BY Earl D. Ayers
AGENT

United States Patent Office 3,320,694
Patented May 23, 1967

3,320,694
HERBICIDE DISPENSER
Raphael A. Biron, Sanford, Mich., assignor to The Dow Chemical Company, Midland, Mich., a corporation of Delaware
Filed Dec. 3, 1965, Ser. No. 511,423
2 Claims. (Cl. 47—1.5)

This invention relates to apparatus for controlling fast growing unwanted plants which are mixed with other plants, and particularly to apparatus for selectively applying plant control chemicals to such fast growing plants.

Many crop plants, such as navy bean plants, for example, are slow growing as compared to so-called weed plants. The weed plants tend ot grow higher than the crop plants and shade the crop plants in addition to using soil nutrients from which no economic yield is achieved.

Weed control chemicals may be sprayed over the plants, but this usually results in the killing of the wanted plants, too.

Selective application of weed killer chemicals to the taller weeds by means of bar type chemical dispensers has been accomplished. However, such bar type dispensers are rather expensive and are usually not completely consumed before the bar breaks up and becomes unusable. Thus while bars (of hard soap-like consistency) are a useful tool in the selective control of plants, they are not entirely satisfactory, expecially from an economic standpoint.

Accordingly, a principal object of this invention is to provide an improved apparatus for selectively applying plant control chemicals to plants.

Another object is to provide an improved, more economical apparatus for selectively applying plant control chemicals to plants.

In accordance with this invention there is provided a hollow bar element having perforations therein and which is covered by a porous sleeve. Thickened plant control chemical, under pressure, is fed into the bar which is adjustable in height whereby it may be set to contact tall weed type plants while not contacting slower growing, less tall crop plants. As the bar is drawn along the plants, the thickened chemical which permeates the porous sleeve contacts the weeds but does not drip or run onto the crop plants. While the chemical reservoir may be pressurized by a hand pump, a pressurized nitrogen tank is often used to achieve the pressurization of the reservoir and force the thickened chemical through a tube and into the bar.

The invention, as well as additional objects and advantages thereof, will best be understood when the following detailed description is read in connection with the accompanying drawing, in which.

Figure 1:
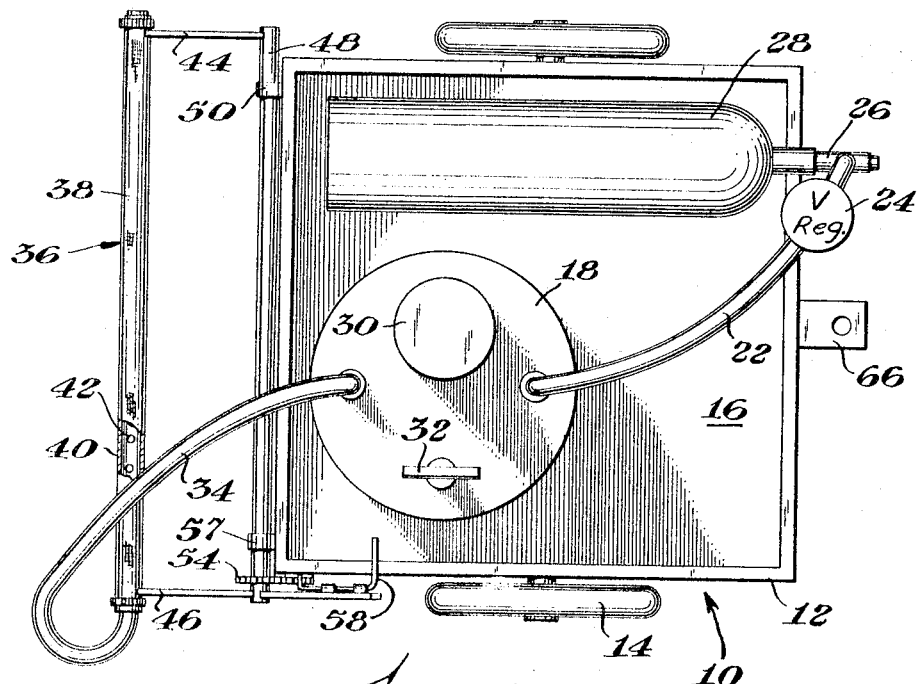
FIG. 1 is a plan view of apparatus in accordance with this invention.
Figure 2:
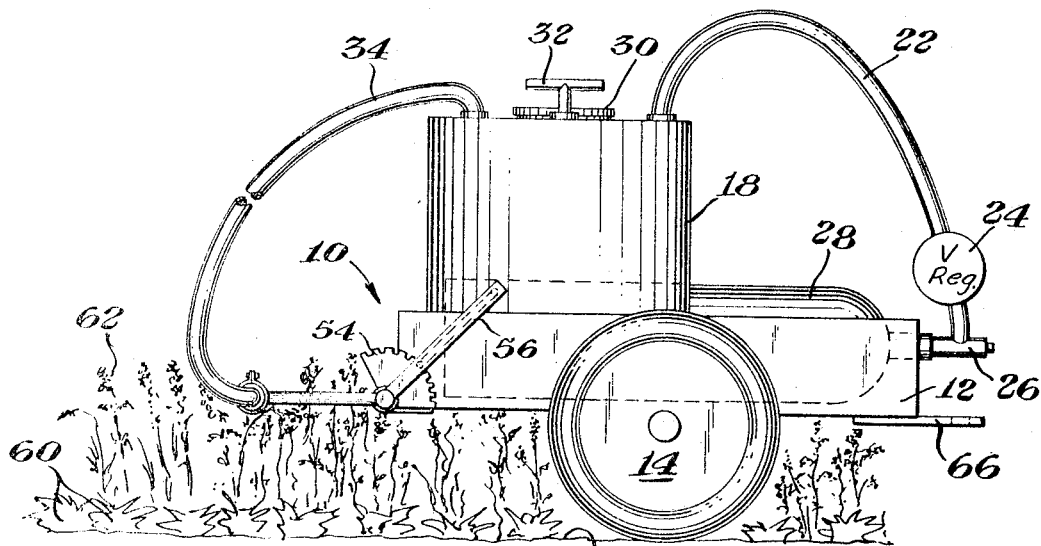
FIG. 2 is a side elevational view of apparatus in accordance with this invention.

Referring to the drawing, there is shown plant chemical applying apparatus, indicated generally by the numeral 10.

As shown, a box trailer 12 having wheels 14 and a tongue 66 carries, in its bed 16, a tank or chemicals reservoir 18 which may be pressurized by means of a hand pump 32 or by means of a gas from a cylinder 28 as applied through the tube 22, pressure regulator 24 and outlet header 26 of the cylinder 28.

A threaded cap or closure element 30 is provided in the top of the tank 18.

An elongated hollow chemical distribution bar, indicated generally by the numeral 36, is rigidly coupled by means of brackets 44, 46 to a second elongated bar 48. The bar 48 is rotatably coupled to the rear of the trailer 12 by means of journals 50, 57 which are secured to the trailer. A control bar 56, at one end of the bar 48, provides means for rotating the bar 48 and thereby raising or lowering the distribution bar 36. A notched segment 54 attached to the side of the trailer 12 adjacent to the bar 48 is used, in conjunction with the catch bar 58 slidably attached to the control bar 56, to lock the bar 48 in a pre-set position.

The tank 18 is coupled to the distribution bar 36 by means of a hose or tube 34.

The bar 36 comprises a metal or plastic tube 40 having spaced apart perforations 42 along its length and having one end closed and the other end coupled to the tube 34. A porous sleeve 38 fits closely but slidably over the tube 40 and is secured at its ends.

In operation, the tank is filled with a mixture of a so-called weed killer chemical such as a 2,4-D solution, for example, which has been thickened with Methocel to a consistency which will permit it to ooze slowly through the sleeve 38 when under pressure of a few pounds, and the tank is then pressurized, as by means of the nitrogen or other gas in the tank 28.

The distribution bar height is adjusted to a height above the ground 64 such that the bar 36 contacts the taller weeds 62 but does not contact the lower crop plants 60.

Thus, as the trailer 12 is drawn along through the planted area by a vehicle (not shown), the chemical which oozes through and adheres to the outer surface of the sleeve 38 contacts only the weeds 62.

The manner of operation of this invention, as may be seen above, is to mix a chemical solution with a thickening agent, place the thickened chemical solution under pressure, and then ooze the thickened chemical through a porous distribution element while contacting the plants to be controlled with the distributing element.

The result is that the contacted plants are either killed or stunted so that they shrivel and open the space surrounding the wanted crop plants 60.

A variety of chemical solutions may be used, the choice being made in accordance with the type of weed or other plant to be preferentially treated.

The porous sleeve 38 may be made of cloth (natural or synthetic fibers), woven metal strands, or may be made of a composite porous material such as sintered particles of metal, for example.

The amount of thickening agent used with the chemical solution to be dispensed through the bar 36 depends on the characteristics both of the bar and the chemical, and on the pressure to be applied to the chemical. Those skilled in the art will easily develop empirical formulations suitable for use in a particular application.

While the bar 40 may be made of a variety of materials, of which plastic and metal are examples, the chemical being dispensed should not react with the bar 40, or with the tank 18 or tube 34.

It is contemplated that the apparatus of the invention may take modified forms without departing from the scope of the appended claims.

What is claimed is:
1. Apparatus for chemically treating plants of predetermined height, comprising
   (A) an elongated hollow perforated chemical dispensing bar having a porous outer sleeve disposed thereon;
   (B) lever controlled adjustable means for maintaining said dispensing bar at a predetermined height above the ground;
   (C) an enclosed pressurizable chemicals container;
   (D) tubular means coupling said chemicals tank to said dispensing bar;

(E) means including a tank of pressurized gas coupled by hose to said container for pressurizing said chemicals, and
(F) wheeled means for drawing said bar through a planted area and for transporting said container and gas tank.

2. Apparatus in accordance with claim 1, wherein said sleeve is a fabric sleeve.

References Cited by the Examiner

UNITED STATES PATENTS

| | | | |
|---|---|---|---|
| 2,696,696 | 12/1954 | Tigerman | 47—1 |
| 2,935,818 | 5/1960 | Crane | 47—1.5 |
| 3,198,396 | 8/1965 | Bailey | 222—176 |

ABRAHAM G. STONE, *Primary Examiner.*

ROBERT E. BAGWILL, *Examiner.*